(12) United States Patent
Herfurth et al.

(10) Patent No.: US 10,947,723 B2
(45) Date of Patent: Mar. 16, 2021

(54) MULTILAYERED LAYERED BODY COMPRISING A THERMAL INSULATION BODY

(71) Applicant: Knauf Gips KG, Iphofen (DE)

(72) Inventors: Dominik Herfurth, Iphofen (DE); Klaus Wandler, Roedelsee (DE)

(73) Assignee: Knauf Gips KG, Iphofen (DE)

( * ) Notice: Subject to any disclaimer, the term of this patent is extended or adjusted under 35 U.S.C. 154(b) by 242 days.

(21) Appl. No.: 15/774,660

(22) PCT Filed: Nov. 11, 2015

(86) PCT No.: PCT/EP2015/002258
§ 371 (c)(1),
(2) Date: May 9, 2018

(87) PCT Pub. No.: WO2017/080567
PCT Pub. Date: May 18, 2017

(65) Prior Publication Data
US 2018/0347181 A1 Dec. 6, 2018

(51) Int. Cl.
*E04B 1/80* (2006.01)
*B32B 7/12* (2006.01)
(Continued)

(52) U.S. Cl.
CPC .............. *E04B 1/803* (2013.01); *B29C 63/04* (2013.01); *B32B 3/04* (2013.01); *B32B 5/022* (2013.01); *B32B 5/16* (2013.01); *B32B 5/18* (2013.01); *B32B 5/24* (2013.01); *B32B 5/30* (2013.01); *B32B 7/12* (2013.01); *B32B 9/005* (2013.01); *B32B 9/046* (2013.01); *B32B 9/048* (2013.01); *B32B 9/06* (2013.01); *B32B 13/02* (2013.01); *B32B 13/04* (2013.01); *B32B 13/08* (2013.01); *B32B 13/14* (2013.01); *B32B 15/08* (2013.01); *B32B 15/18* (2013.01); *B32B 15/20* (2013.01);
(Continued)

(58) Field of Classification Search
CPC .................................. E04B 1/80; E04B 1/803
See application file for complete search history.

(56) References Cited

U.S. PATENT DOCUMENTS 6,863,949 B2 3/2005 Ehrmanntraut
2002/0074916 A1 6/2002 Wenning et al.
(Continued)

FOREIGN PATENT DOCUMENTS

CN 103938745 A 7/2014
DE 29922190 U1 3/2000
(Continued)

OTHER PUBLICATIONS

Machine translation of JP 2009-280772 A (Year: 2009).*
An Office Action/Search Report for related Applicaion No. EP 15820431.3 (dated Mar. 30, 2020).

*Primary Examiner* — Ramsey Zacharia
(74) *Attorney, Agent, or Firm* — The Webb Law Firm

(57) ABSTRACT

A multilayered layered body comprising an evacuated thermal insulation body (12) having a core material (13), which is enclosed by a gas-tight film (16), wherein the thermal insulation body (12) has a first flat side (14) and a second flat side (15), which is arranged opposite of the first side, wherein a lamination layer (17) is laminated onto at least one flat side (14, 15).

19 Claims, 5 Drawing Sheets

(51) Int. Cl.
*B32B 13/08* (2006.01)
*B32B 29/00* (2006.01)
*B32B 15/08* (2006.01)
*B32B 5/16* (2006.01)
*B32B 5/18* (2006.01)
*B32B 5/24* (2006.01)
*B32B 5/30* (2006.01)
*B32B 27/14* (2006.01)
*B32B 5/02* (2006.01)
*B32B 15/20* (2006.01)
*B32B 9/06* (2006.01)
*B32B 27/10* (2006.01)
*B32B 9/04* (2006.01)
*B32B 15/18* (2006.01)
*B29C 63/04* (2006.01)
*B32B 9/00* (2006.01)
*B32B 13/04* (2006.01)
*B32B 3/04* (2006.01)
*B32B 13/02* (2006.01)
*B32B 13/14* (2006.01)

(52) U.S. Cl.
CPC .............. *B32B 27/10* (2013.01); *B32B 27/14* (2013.01); *B32B 29/002* (2013.01); *B32B 2264/102* (2013.01); *B32B 2266/06* (2013.01); *B32B 2307/304* (2013.01); *B32B 2307/718* (2013.01); *B32B 2307/72* (2013.01); *B32B 2307/7242* (2013.01); *B32B 2307/732* (2013.01); *B32B 2419/00* (2013.01); *B32B 2607/00* (2013.01); *Y02A 30/242* (2018.01); *Y02B 80/10* (2013.01)

(56) References Cited

U.S. PATENT DOCUMENTS

2013/0071640 A1    3/2013  Szillat
2016/0102018 A1*   4/2016  Dorris .................. B32B 29/005
                                                         428/116

FOREIGN PATENT DOCUMENTS

| DE | 102011118604 A1 | 5/2013 |
| EP | 1177879 A2 | 2/2002 |
| EP | 2119841 A2 | 11/2009 |
| FR | 2880639 A1 | 7/2006 |
| JP | 54110113 U | 8/1979 |
| JP | 200130397 A | 2/2001 |
| JP | 200695745 A | 4/2006 |
| JP | 2009280772 A | 12/2009 |
| JP | 201212860 A | 1/2012 |
| JP | 2012077143 A | 4/2012 |
| JP | 2013530325 A | 7/2013 |
| WO | 2006129130 A2 | 12/2006 |

* cited by examiner a)

b)

c)

d)

MULTILAYERED LAYERED BODY COMPRISING A THERMAL INSULATION BODY

CROSS-REFERENCE TO RELATED APPLICATION

This application is the United States national phase of International Application No. PCT/EP2015/002258 filed Nov. 11, 2015, the disclosure of which is hereby incorporated in its entirety by reference.

BACKGROUND OF THE INVENTION

Field of the Invention

The invention relates to a multilayered layered body comprising an evacuated thermal insulation body having a core material, which is enclosed by a gas-tight film, wherein the thermal insulation body has a first flat side and also a second flat side arranged opposite, as well as a method for producing a multilayered layered body.

Description of Related Art

Evacuated thermal insulation bodies have become known in the field of thermal insulation technology and are available on the market. They are also referred to as VIPs (Vacuum Insulated Panels). The fundamental construction is explained, for example, in EP 1 177 879 B1, the content of the disclosure of which with respect to construction and function of a thermal insulation body is referred to in the present case.

Thermal insulation bodies of the above-described type are construction materials, in which a core material is enclosed by a gas-tight film, wherein a vacuum is generated inside the core material which is usually porous enclosed by the gas-tight film. The thermal insulation body is preferably evacuated by the producer to a vacuum of less than 100 hPa, preferably less than 10 hPa, in particular less than 1 hPa. The physical principle of vacuum insulation using the above-described thermal insulation body is equivalent to that of a vacuum flask: thermal transport cannot take place via the movement of air (convection) in a space empty of air.

The core material can consist of a powder or pourable insulation material made of open-pored material. Pyrogenic silicic acid is often used. The thermal insulation body obtains its strength and rigidity by way of the introduced vacuum and the pressure provided hereby on the gas-tight film. The gas-tight film has to be very high performance, since damage to this film results in failure of the thermal insulation body. The gas-tight film is generally a metallized plastic film or a laminate made of metal foils and plastic films. Processing the above-described thermal insulation body in the region of façades is frequently performed using a bracket construction, which divides the façades into cassettes. These cassettes are filled using the above-described thermal insulation bodies. The façade paneling or a thermal insulation composite system can be installed thereon.

The above-described thermal insulation bodies are very sensitive, however. Damage to the gas-tight film has the result that the thermal insulation body aerates and loses a majority of its high thermal insulation effect because of the vacuum effect which is no longer provided. Further properties of the thermal insulation bodies in the form of VIPs have restricted the use thereof in structures. These properties include:

restricted fastening possibilities on a supporting surface, such as masonry, concrete, etc., against the background of the sensitive gas-tight film of the thermal insulation body designed as a VIP;

poor adhesive properties upon the application of typical surface layers, such as plaster, planar putty, etc., onto the thermal insulation body;

sensitivity of the thermal insulation body to mechanical effects in the course of the processing.

Proceeding from these problems, the invention provides a multilayered layered body, which does not have the above-mentioned disadvantages, in particular is less sensitive and enables more versatile handling. In addition, a method for producing such a multilayered layered body is disclosed.

SUMMARY OF THE INVENTION

A core consideration of the present invention is based on the concept that a lamination layer is laminated onto at least one flat side of the thermal insulation body. "Laminating on" is to be understood here as any type of connection of the lamination layer to the thermal insulation body which can be considered to be sufficiently permanent and reliable for the intended applications in the construction field, in particular a connection by gluing. The laminating on is preferably performed in this case via at least one flat side of the thermal insulation body, so that the thermal insulation body is at least partially, preferably completely covered by the lamination layer on this first flat side. It is possible in this case that the lamination layer terminates flush with the thermal insulation body or protrudes beyond the thermal insulation body and thus forms an excess. This protruding excess can be used and/or bent over during the fastening of the multilayered layered body on a supporting surface, for example, such that lateral regions of the thermal insulation body are still covered upon fastening of the thermal insulation body on a supporting surface, such as a wall.

In a preferred embodiment, the multilayered layered body is in the form of panels. However, cuboid VIPs or VIPs in other shapes are also fundamentally conceivable. A panel-shaped layered body is generally particularly simple to install for thermal insulation purposes, however, and to attach to adjacent, correspondingly formed panel-shaped layered bodies.

In a preferred embodiment, the laminated-on lamination layer is an external component of a jacketed plasterboard, so that a jacketed plasterboard is laminated onto the thermal insulation body and a layered body comprising the evacuated thermal insulation body and the jacketed plasterboard is provided.

In this regard, not only a lamination layer, but rather a lamination layer as a component of a further element, in particular a further layered body, especially as a component of a jacketed plasterboard, can be permanently applied to the thermal insulation body.

The thermal insulation body is protected substantially better, with low structural height nonetheless, by the jacketed plasterboard positioned in front. The laminated-on lamination or plasterboard layer additionally fulfills the object of a protective layer for the thermal insulation body designed as a VIP in this regard. In the event of mechanical action, firstly the lamination layer or plasterboard has to be penetrated, before the gas-tight film of the evacuated thermal insulation body is damaged. These thermal insulation bodies are suitable in particular in the region of high mechanical stress, for example, for wall regions easily accessible to persons, for example, thermal bridge retrofitting at T-connections of inner walls to outer walls, at which an increased risk of damage exists. A plasterboard layer represents very effective protection here. Laminated surfaces enable, which also applies for the application of a lamination layer per se to the thermal insulation body of course, the application of adhesives, plasters, putties, paints, primers, etc., which are typical in construction practice. In this way, the field of application of the insulation bodies designed as VIPs in construction engineering is substantially expanded.

To promote the adhesion of the lamination layer to the thermal insulation body, firstly a primer layer can be arranged on the thermal insulation body. The gas-tight film usually forms small wrinkles due to the evacuation process, so that the flat side of the evacuated thermal insulation body facing toward the lamination layer to be fastened can initially be provided with slight irregularities or ripples. A primer layer can improve the adhesion and/or form a flat, even supporting surface on the flat side of the evacuated thermal insulation body facing toward the lamination layer to be applied.

In a preferred embodiment, the lamination layer can be permanently applied to the thermal insulation body, which is optionally provided with a primer layer, by means of an adhesive layer. In this case, the adhesive layer can initially be provided on or applied to the cardboard layer itself before the connection of lamination layer and thermal insulation body. Alternatively, it is possible that the adhesive layer is attached or applied to the flat side of the thermal insulation body facing toward the lamination layer before the connection of the lamination layer to the thermal insulation body. Finally, it is possible to provide an adhesive layer both on the lamination layer and also on the thermal insulation body, so that lamination layer and thermal insulation body are permanently connected to one another via an adhesive layer which is then shared.

The adhesive layer can thus be formed as single-layer or multilayered, homogeneous or inhomogeneous, planar, linear, or interrupted. An adhesive layer can have or comprise the following materials, for example: white glue, PU (polyurethane), hot-melt adhesives, etc. An application of the adhesive can be performed, for example, by spraying, painting, squeegeeing, application by roller, application in the form of adhesive cords or beads from adhesive nozzles, for example, in cartridge application, inter alia. Both manual and also machine processes are conceivable, to thus form one or more adhesive layers.

In a special embodiment, the thickness of the evacuated thermal insulation body is not less than 5 mm and not greater than 100 mm, preferably not less than 5 mm and not greater than 40 mm, particularly preferably not less than 5 mm and not greater than 10 mm. The thermal insulation body integrated in the multilayered layered body is therefore designed having a very flat structure, so that an overlap with a lamination layer and/or a plasterboard which is not excessively thick still provides a multilayered layered body having a flat structure, which is outstandingly suitable for insulation purposes because of the very high thermal insulation properties. Thin thermal insulation bodies having 5 to 7 mm thickness have the additional benefit that they can be buckled or folded. An embodiment in corner regions of soffits is therefore also possible. For this purpose, the thermal insulation body is fitted following the soffit profile by buckling. The problem of not being able to cut to size is therefore bypassed. The ability to buckle a thermal insulation body thus coated can be achieved by predefined intended buckling points in the plasterboard, for example, in the form of V-shaped milled grooves.

In a preferred embodiment, the jacketed plasterboard can comprise two lamination layers arranged spaced apart from one another, namely the lamination layer facing toward the thermal insulation body and also a lamination layer facing away from the thermal insulation body and a plaster core arranged in between. The plaster core can be embodied as homogeneous or inhomogeneous in this case, in particular also multilayered, perpendicularly to the extension of the jacketed plasterboard. The lamination layers can be provided as single-layer or multilayered and also optionally equipped with further coatings.

A preferred thickness of the laminated-on plasterboard is not less than 5 mm and not greater than 25 mm, preferably not less than 10 mm and not greater than 20 mm.

A preferred density of the plaster core is not less than 450 kg/m$^3$ and not greater than 1500 kg/m$^3$, preferably not less than 550 kg/m$^3$ and not greater than 700 kg/m$^3$. If a plaster core does not have homogeneous density, but rather is an inhomogeneous or multilayered plaster core, these can be understood as values for a mean density.

Perpendicularly to the planar extension of the jacketed plasterboard, the plaster core can be formed as homogeneous or inhomogeneous, in particular as multilayered.

In a further special embodiment, the jacketed plasterboard and/or the thermal insulation body can have a wedge-shaped basic shape, so that a wedge-shaped layered body is provided having a thickness which decreases continuously from a first end to a second end.

The one or more lamination layers can be formed by a cardboard layer or nonwoven layer or fiber layer. All of these layers can be laminated on without problems and can be connected to a plaster layer, so that a layered body having the described advantages can be obtained.

To reinforce the evacuated thermal insulation body sufficiently and at the same time to ensure further possible applications, such as improved fastening options or application of plasters, putties, etc. in a sufficient manner, it is preferable if the lamination layer is formed as a cardboard layer and has a grammage of not less than 80 g/m$^2$ and not greater than 220 g/m$^2$, preferably not less than 80 g/m$^2$ and not greater than 120 g/m$^2$. Thermal insulation bodies laminated with such cardboard can also still be buckled or folded without problems.

The method for producing a multilayered layered body, in particular a layered body as described above, comprises the following steps:
  a) providing an evacuated thermal insulation body, which comprises a first flat side and a second flat side, in which a core material is enclosed by a gas-tight film and
  b) laminating on a lamination layer, which covers the thermal insulation body, such that a permanent bond is provided between thermal insulation body and lamination layer.

Using this method, a multilayered layered body is provided, which comprises an evacuated thermal insulation body like a VIP, in which the evacuated thermal insulation body is substantially better protected and at the same time more diverse possibilities result with respect to the use and/or the fastening of the layered body comprising the evacuated thermal insulation body.

In a special embodiment of the method according to the invention, the external cardboard layer of a jacketed plasterboard is laminated onto the evacuated thermal insulation body as the lamination layer, so that a layered body comprising the evacuated thermal insulation body, on the one hand, and a jacketed plasterboard, on the other hand, is provided, in which the jacketed plasterboard covers the evacuated thermal insulation body on one flat side and in this regard also protects it.

In a special embodiment, before the lamination of the jacketed plasterboard onto the thermal insulation body, a primer layer can be applied to the thermal insulation body. This step can be advisable to improve the adhesion between the gas-tight film of the evacuated thermal insulation body and the lamination layer or to compensate for the ripples of the gas-tight film, which often form in the evacuated state.

In a preferred embodiment, an adhesive, for example, white glue, polyurethane adhesives, or a hot-melt adhesive can be applied to form an adhesive layer before the lamination of the lamination layer onto the thermal insulation body and/or onto the cardboard layer.

In a further preferred embodiment, the adhesive is applied by spraying, painting, squeegeeing, rolling, or by application of an adhesive bead, for example, by cartridge application.

It is possible to perform the application of the adhesive flatly or in a predefined grid or dot pattern or in a meandering shape, in particular in the case of the application of an adhesive bead.

Overall, the application of the adhesive can be performed in a manual or machine process. This also applies for the application of a possibly necessary or desired primer layer or for the joining together of evacuated thermal insulation body and lamination layer or evacuated thermal insulation body and jacketed plasterboard.

Both with respect to the device and also with respect to the method, it can be advantageous to laminate the evacuated thermal insulation body with a lamination layer on both opposing flat sides. In this case, lamination layers without further elements can be provided on both sides, however, a lamination layer without further elements can also be provided on one side and a jacketed plasterboard can be provided on the other side. Finally, of course, it is also possible to laminate or clad the evacuated thermal insulation body on both sides with a jacketed plasterboard.

Cardboard layers, nonwoven layers, or fiber layers are again preferably used as the lamination layers for the method according to the invention, to ensure good lamination properties with suitable connectability to the thermal insulation body and the plasterboard at the same time.

In a preferred refinement of the method, the layered body is provided as a layered body formed as a panel.

The multilayered layered body constructed according to the invention can be used for different insulation purposes, for example, for insulating a wall, ceiling, or a floor. In the floor region, for example, multiple layered bodies formed according to the invention can be laid adjacent to one another and embedded in a screed layer. The use of a layered body according to the invention for insulating a window or door soffit or for insulating an outer wall-inner wall connection or for insulating a story-ceiling connection is particularly preferred.

BRIEF DESCRIPTION OF THE DRAWINGS

The invention will also be explained in greater detail hereafter with respect to further features and advantages on the basis of the description of exemplary embodiments and with reference to the appended drawings.

In the figures.

DESCRIPTION OF THE INVENTION

A cardboard layer is described as a lamination layer in the following statements. This special selection of the lamination layer is not to be understood as restrictive for the invention, however.

Figure 1:
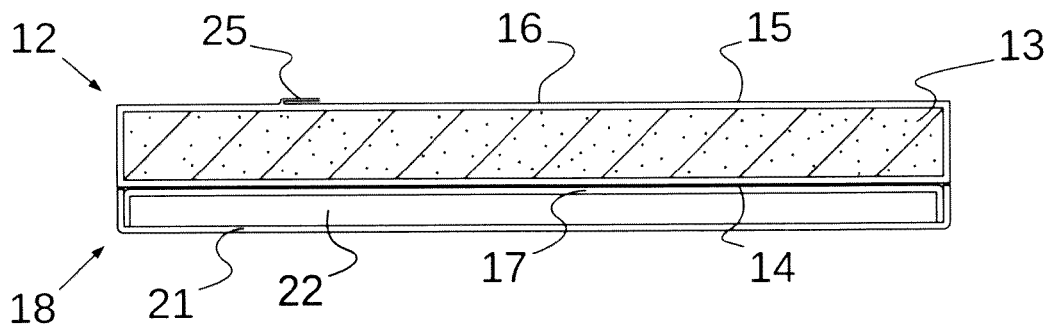
FIG. 1 shows an exemplary embodiment of a multilayered layered body in a sectional view.
Figure 2:
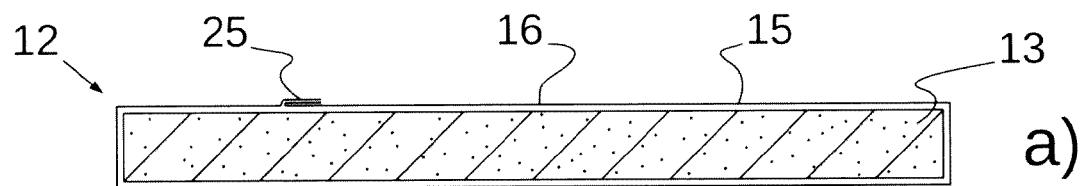
FIG. 2 shows an illustration of the buildup in the method of the multilayered layered body according to FIG. 1.
Figure 2:
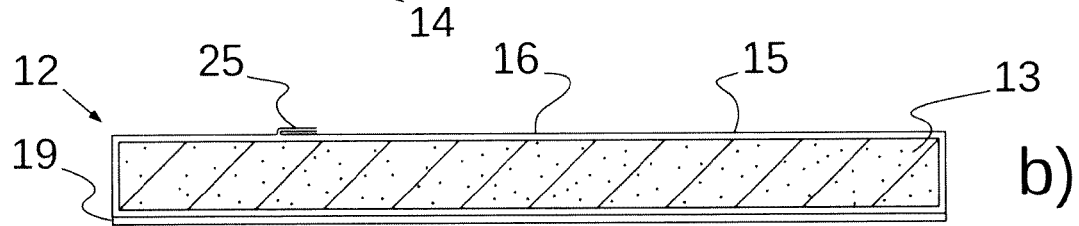
Figure 2:
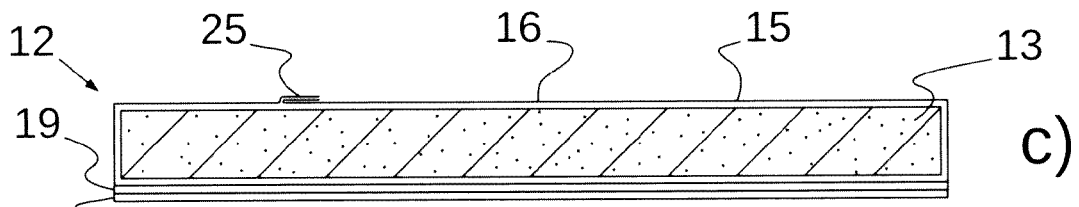
Figure 2:
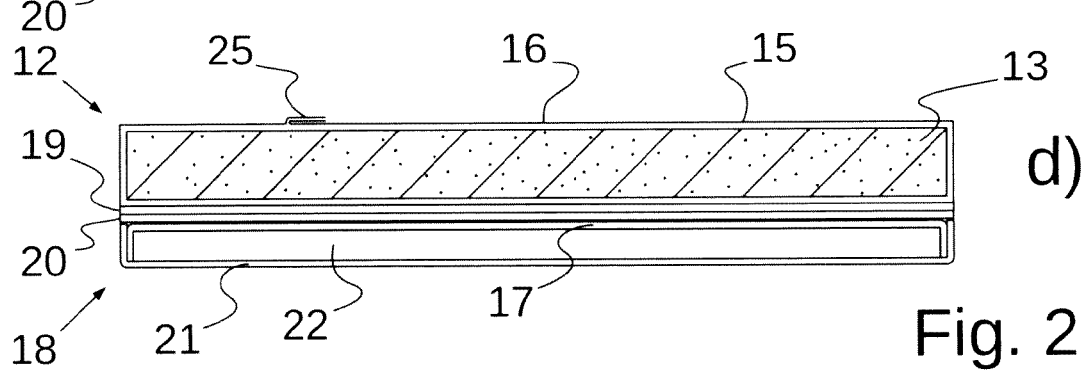

FIG. 1 shows a first embodiment of a multilayered layered body 11 according to the present invention in a sectional view. The multilayered layered body, which is formed as a panel here, comprises an evacuated thermal insulation body 12 having a core material 13, which is enclosed by a gas-tight film 16. The thermal insulation body 12 forms a first flat side 14 and a second flat side 15, which is arranged opposite, in this case. A plasterboard slab 18 is laminated onto the first flat side 14 here, the specific structure of the production sequence will become apparent from FIG. 2.

FIG. 2a firstly shows the thermal insulation body 12 with the core material 13, which is enclosed by a gas-tight film 16. The gas-tight film 16 is enclosed gas tight using a seal 25 such that a vacuum of less than 100 hPa, preferably less than 10 hPa, in particular less than 1 hPa may be introduced into the inner region filled with the core material 13 and may be essentially maintained and an insulating thermal insulation body is thus provided. In the present embodiment, in a first step (cf. FIG. 2b), a primer layer 19 is applied to the side opposite to the seal 25, which has the purpose, on the one hand, of compensating for the ripples arising due to the evacuation procedure of the gas-tight film 16 and, on the other hand, to cause a better adhesion supporting surface for the application of an adhesive layer 20.

The application of the adhesive layer 20 is performed in a subsequent step (cf. FIG. 2c). In a following step (cf. FIG. 2d), a plasterboard slab 18 comprising a cardboard layer 17, which faces toward the thermal insulation body 12, is laminated onto the adhesive layer 20, i.e., fastened permanently on the thermal insulation body 12 by means of the adhesive layer 20. The plasterboard slab 18 has in this case—as is also recognizable in FIG. 1—the above-mentioned cardboard layer 17 and a cardboard layer 21 facing away from the thermal insulation body 12.

The plasterboard slab 18 additionally has a plaster core 22 between the cardboard layer 17 facing toward the thermal insulation body 12 and the cardboard layer 21 facing away from the thermal insulation body 12. The thermal insulation body 12 is better protected and further reinforced by the laminated-on plasterboard slab 18. In addition, the insulating effect of the thermal insulation body 12 is increased. Finally, further processing and handling possibilities result, as already noted.

If the plasterboard slab 18 is formed with a predefined visible side and a rear side, fastening the thermal insulation body 12 on the rear side of the plasterboard slab 18 suggests itself.

Figure 3:
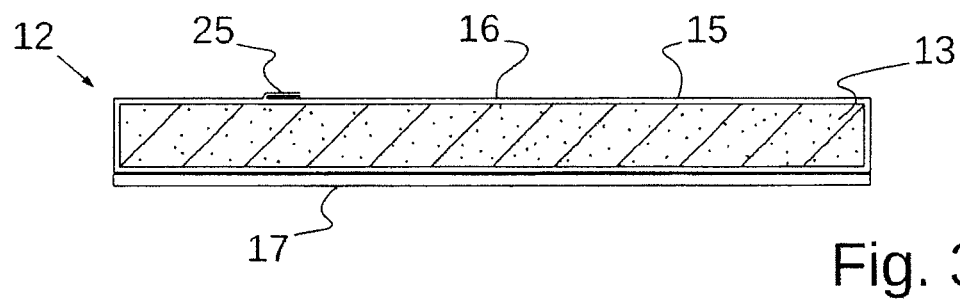
FIG. 3 shows an embodiment, altered in relation to the embodiment according to FIG. 1, of a multilayered layered body in a sectional view.

FIG. 3 illustrates an altered embodiment of a multilayered layered body. Instead of a plasterboard slab 18, a cardboard layer 17, preferably a cardboard layer 17 without further additional elements, is laminated onto the thermal insulation body 12 here. In the embodiment according to FIG. 3, the cardboard layer 17 thus forms a surface of the multilayered layered body, which is formed as a panel here. In the embodiment according to FIG. 1, in contrast, the cardboard layer 21 facing away from the thermal insulation body 12 can define a visible side of the multilayered layered body.

Figure 4:
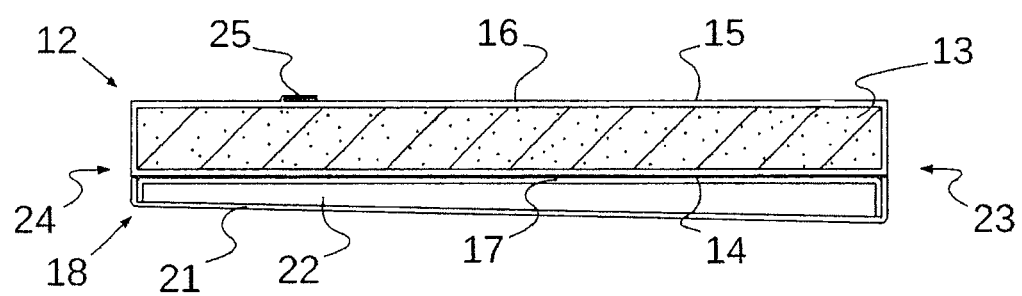
FIG. 4 shows an embodiment, altered in relation to the embodiment according to FIG. 1, in which the layered body is formed as a wedge-shaped layered body.

FIG. 4 shows an embodiment altered in relation to the embodiment according to FIG. 1, in which the layered body 11 is formed as a wedge-shaped layered body. In the present embodiment, the thermal insulation body 12 is formed as essentially plane-parallel, i.e., having a first flat side 14 which extends in parallel to a second flat side 15, in this case. The plasterboard slab 18 itself, however, is formed as wedge-shaped and has a greater thickness of, for example, 12.5 mm on a first end 23 of the layered body and a lesser thickness of, for example, 5 mm on a second end 24 of the layered body 11. In this way, a layered body 11 which is wedge-shaped overall is formed, which can be suitable in particular for insulating corner regions.

The flatter end of the layered body 11 represents the transition to the uninsulated wall and can be puttied/plastered over so it is practically invisible.

Figure 5:
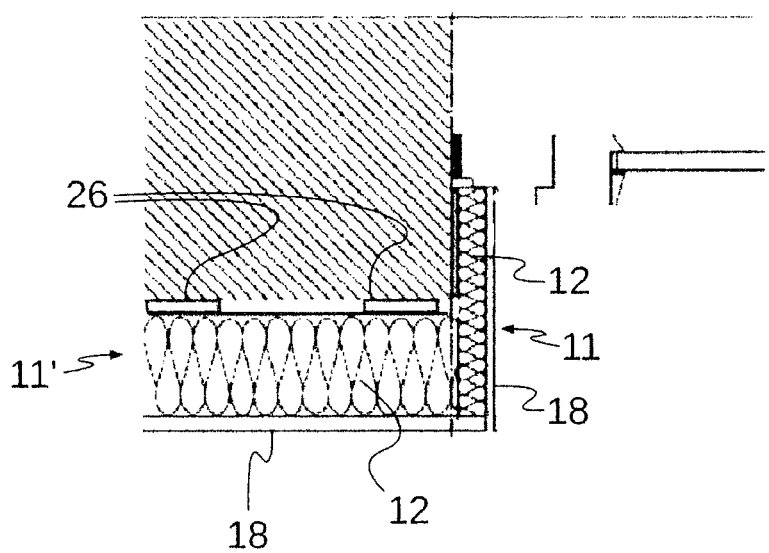
FIG. 5 shows an illustration of a first exemplary application.

FIG. 5 illustrates a first exemplary application of a multilayered layered body, which is formed as a panel here, according to the present invention. A window soffit is shown in horizontal section having a soffit insulation. A first multilayered layered body 11 according to the present invention is fastened to the masonry directly adjoining the window perpendicularly and covering the inner region of the window soffit. A second body 11' according to the present invention is attached adjoining thereon at a right angle thereto so it covers the masonry. In the multilayered layered bodies 11, 11', which are formed as panels, illustrated here, the evacuated thermal insulation body 12 is clad on the outside in each case with a laminated-on plasterboard slab 18. Toward the masonry, plasterboard strips 26 are fastened on the masonry, which enable a particularly simple attachment of the multilayered layered body, which is formed as a panel, according to the present invention. However, the second insulation body 11' can also be a conventional insulation.

In this example the layered body 11 directly adjoining the window has a total thickness of 26.5 mm, wherein the thermal insulation body 12 has a thickness of 20 mm, and the external plasterboard slab 18 has a thickness of 6.5 mm.

The layered body 11' adjoining the side opposite to the window perpendicularly has a total thickness of 92.5 mm with a thermal insulation body 12 of 80 mm thickness and a plasterboard slab 18 of 12.5 mm thickness. This thermal insulation body can be embodied in a conventional manner or according to the invention as described above. The dimensions can be very different and adapted to special circumstances. Thus, the above mentioned dimensions are examples, only.

The use of VIPs is particularly advantageous where only a small amount of space is available. This is the case, for example, in window or door soffits of many existing buildings. A layered body according to the invention can be used particularly advantageously here, since these layered bodies are both comparatively insensitive to damage and also only require a small amount of space. If the thermal insulation body is laminated with cardboard, it can advantageously be folded, for example, in corner regions.

Figure 6A:
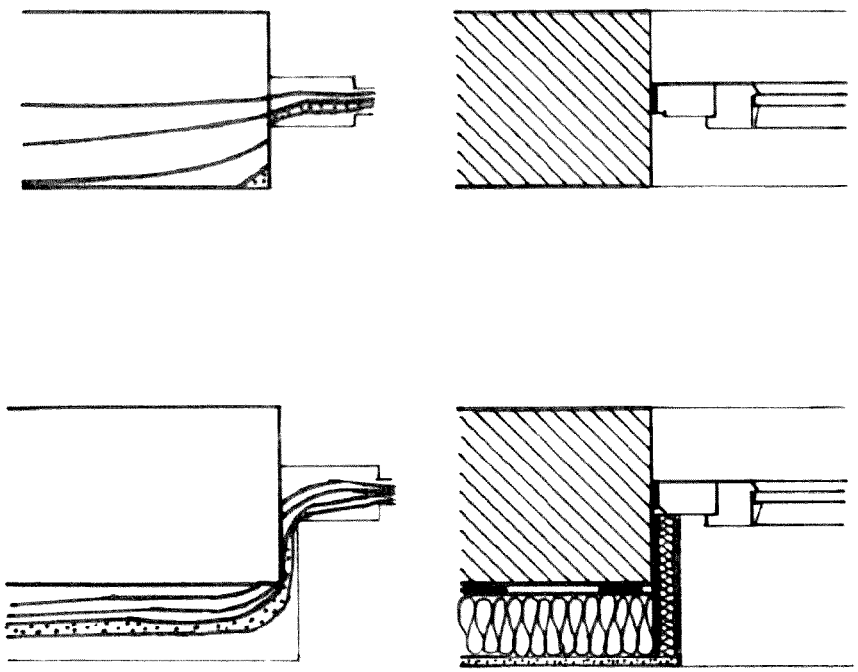
FIG. 6A shows a comparison of the first exemplary application according to the prior art and associated isothermal curves.
Figure 6B:
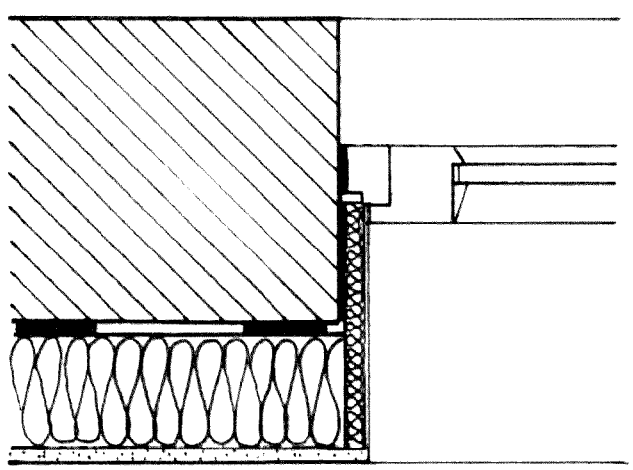
FIG. 6B shows a window soffit isolation with a laminated insulation body according to the invention.

FIG. 6 once again compares the above-described exemplary application to prior art, in which, with the same soffit construction, no insulation is provided. At the same time, the associated isothermal curves are indicated.

The isothermal curves show in comparison that the temperature gradient in the insulated example is practically exclusively located in the region of the insulation, so that practically external temperatures prevail in the masonry. A significant thermal bridge, as is clearly apparent in the uninsulated example, is effectively reduced upon insulation of the window soffit. It is to be presumed that insulation of the window soffit with VIP (FIG. 6B) will result in an equivalent or better reduction of the thermal bridge effects while the thickness of the insulation is equal or less compared to conventional insulations, see second sketch of FIG. 6A.

Figure 7A:
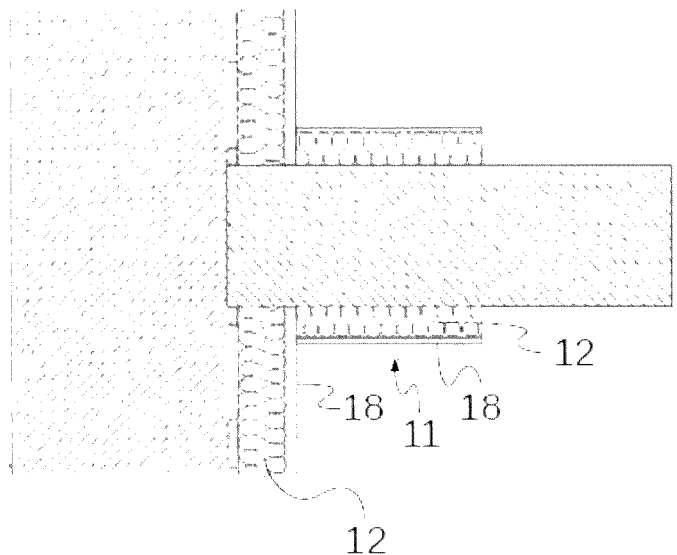
FIG. 7A shows an illustration of an insulation a second exemplary application for a multilayered layered body according to the state of the art.
Figure 7B:
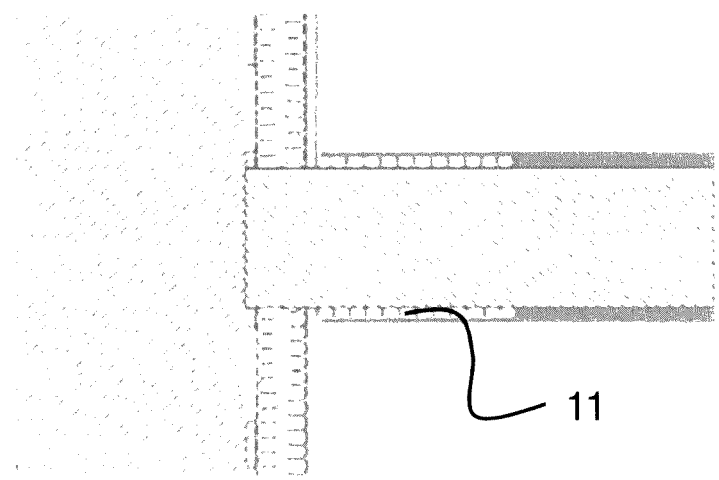
FIG. 7B shows an illustration of the same situation with a multilayered layered body according to the invention.

FIG. 7 shows a comparison of a state of the art embodiment to the second exemplary application for a multilayered layered body according to the invention, formed as a panel here, namely in an outer wall-inner wall connection. FIG. 7B thus shows a horizontal section having partial flank insulation.

The present exemplary embodiment shows the typical situation of a thermal bridge, which can arise in regions in which interior partition walls adjoin exterior walls insulated on the interior. Since the outer wall insulation is interrupted where the partition wall adjoins the exterior wall, a thermal bridge arises in the region of the T-joint.

One solution of this problem is conventionally the partial or full-area insulation of the interior wall from both sides. The full-area insulation is frequently necessary for design reasons, since conventional insulations are relatively thick and therefore visually disturbing edges would arise on the wall if the insulation were not applied over the entire area of the wall, see FIG. 7A.

Using the multilayered layered bodies 11 proposed here, it is possible to produce a relatively flatly built insulation, see FIG. 7B. It is thus possible to let the insulation run out on the wall in the region in which it is no longer needed, in particular in a wedge shape. Because of the relatively low thickness of the insulation, this wedge-shaped runout is hardly visible to the observer.

In a further embodiment of the invention, however, it is also possible to have the insulation end abruptly as shown in FIG. 7B. If a plaster is applied to this interior wall after fastening of the multilayered layered body 11, a uniform surface without visible edges can be produced by the integration of the multilayered layered body 11 in the plaster layer. This is possible because the laminated evacuated thermal insulation bodies 12 have such a low thickness. In addition to avoiding non-aesthetic edges, moreover, there is no space lost in this embodiment.

Figure 8:
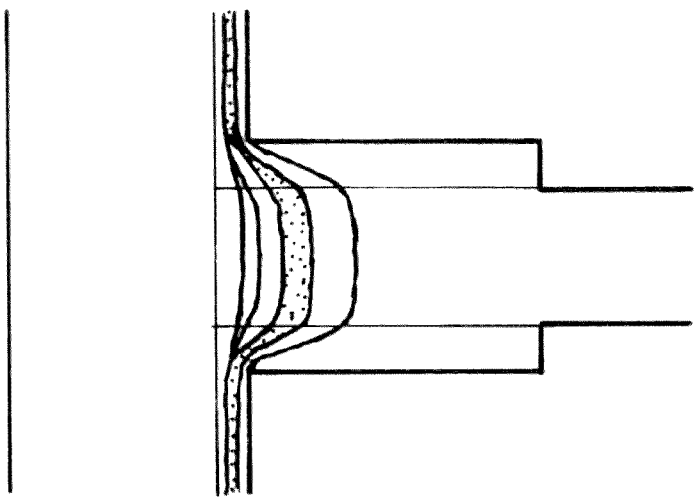
FIG. 8 shows an illustration of isothermal curves associated with the exemplary application according to FIG. 7.

FIG. 8 shows the isothermal curves according to the state of the art shown in FIG. 7A. An insulation of the adjoining wall with VIPs integrated into the plaster (FIG. 7B) will result in an equal reduction of the thermal bridge effect while having a clearly lower thickness.

Figure 9:
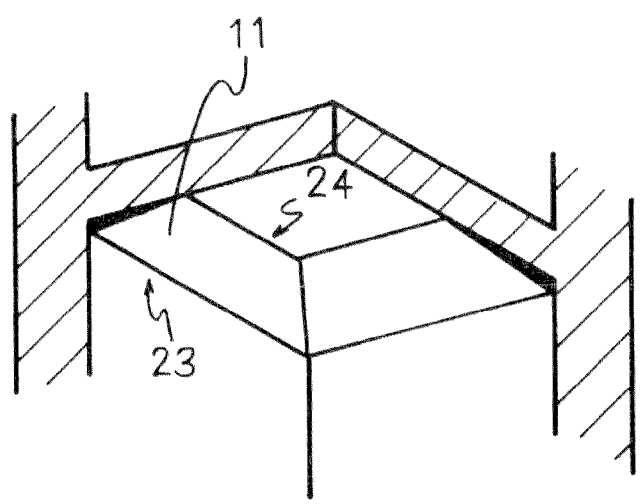
FIG. 9 shows an illustration of a third exemplary embodiment of a multilayered layered body according to the present invention.

FIG. 9 illustrates a third exemplary application, namely the use in a story-ceiling insulation.

The present exemplary embodiment of the invention shows a multilayered layered body according to the present invention in a schematic principle view, which is formed with a continuously decreasing thickness from a first end 23 to a second end 24, i.e., has a wedge-shaped profile overall. A wedge-shaped corner insulation at the attachment point ceiling/exterior wall is enabled in this regard. Due to the low thickness of the insulation, it is possible to embody a visually unobtrusive insulation only in the corner region, in which a thermal bridge is to be prevented, without an insulation wedge having to be attached. In these regions, thin multilayered thermal insulation bodies are integrated into the plaster layer of the ceiling. The advantage of this embodiment is, on the one hand, the improvement of the design quality of the corner embodiment in relation to the use of an insulation wedge. On the other hand, the ceiling height of the insulated room is essentially maintained.

The production of a multilayered layered body according to the invention will be explained hereafter on the basis of a specific example. In this example, the evacuated thermal insulation body 12 is laminated on both sides with a cardboard layer 17. The thermal insulation body 12, which is enclosed by a gas-tight film 16, was pretreated on both sides using Knauf® special adhesive base and, after drying of the primer, a cardboard layer 17, as is used in the production of plasterboard slabs, was glued on using Knauf® white glue. The cardboard of the cardboard layer 17 had a weight per unit area before the processing, i.e., in the dry state, of approximately 180 g/m². To make the cardboard of the cardboard layer 17 to be formed yielding and to avoid wrinkling, it was briefly softened immediately beforehand in the water bath ("wallpaper effect"). The production of the multilayered layered body (a cardboard-laminated VIP) is simple to manage. As a result, the evacuated thermal insulation body 12 is stiffer/more stable.

A special advantage of the laminating of an evacuated thermal insulation body (VIP) with plasterboard cardboard can be seen in that the evacuated insulation bodies 12 having cardboard layer 17 applied on one or both sides can still be buckled. Due to the lamination with a cardboard layer 17 or a cardboard layer 17 applied on both sides, a reinforcement or strengthening of the evacuated thermal insulation body 12 is achieved, without having to entirely give up the flexibility of a non-laminated evacuated thermal insulation body 12. Depending on the intended use of the multilayered layered body according to the invention, of course, a one-sided lamination is also possible. However, the two-sided lamination has the advantage that "dishing" of the laminated evacuated thermal insulation body 12 after the drying can be effectively and simply avoided. "Dishing" is understood in this case as bending up on one side of the edge regions of the laminated evacuated thermal insulation body, which results in a dish shape. The effect of the dishing can also be avoided or limited, however, if instead of a two-sided lamination with a cardboard layer 17, in the case of only one-sided lamination with a cardboard layer 17, a balancing film is laminated onto the side of the thermal insulation body 12 opposite to the cardboard layer 17, which counteracts the effect of the "dishing".

Finally, reference is made to various tests for judging the adhesion properties of a plasterboard slab 18 applied to an evacuated thermal insulation body 12:

The pull-off resistance of plasterboard slabs or plasterboard cardboards were tested, which were glued by means of various primers and various adhesion promoters directly onto the vacuum-tight film of the VIPs.

The products va-Q-plus and va-Q-pro, which were used as the basis of this exemplary study, are both powder-based VIPs, the core of which consists of microporous silicic acid. The panels differ in that only va-Q-pro can be produced without additional treatment in various forms, for example, as a 3D panel or as a panel having a hole provided on the production side.

| Primer | Adhesive | VIPs—Va-Q-pro and Va-Q-plus |
|---|---|---|
| Knauf Spezialgrund (special base) | Knauf Fugenfüller (joint filler) and Knauf Perlfix | GK slab pieces glued directly onto primer. Fracture picture: smooth tear-off (by hand) from film with relatively high force (subjective) |
| Knauf Betokontakt (concrete contact) | Knauf Fugenfüller and Knauf Perlfix | GK slab pieces glued directly onto primer. Fracture picture: smooth tear-off (by hand) from film with relatively low force (subjective) |
| Knauf Quarzgrund (quartz base) | Knauf Fugenfüller and Knauf Perlfix | GK slab pieces glued directly onto primer. Fracture picture: smooth tear-off (by hand) from film with relatively low force (subjective) |
| Knauf Spezialgrund | Knauf white glue | GK cardboard, glue in bead form, very good adhesion both of the primer on the film and also bond primer/cardboard |
| Knauf Betokontakt | Knauf white glue | GK cardboard, glue in bead form, only satisfactory adhesion of the primer on the film |
| Knauf Quarzgrund | Knauf white glue | GK cardboard, glue in bead form, only good adhesion of the primer on the film |
| Knauf Spezialgrund | Knauf Brio Joint Adhesive | GK cardboard, glue in bead form, very good adhesion of both the primer on the film and also bond primer/cardboard |
| Knauf Betokontakt | Knauf Brio Joint Adhesive | GK cardboard, glue in bead form, only satisfactory adhesion of the primer on the film |
| Knauf Quarzgrund | Knauf Brio Joint Adhesive | GK cardboard, glue in bead form, only good adhesion of the primer on the film |

GK = plasterboard
Knauf Spezialgrund: aqueous dispersion made of acrylic copolymer, ground limestone, and additives
Knauf Betokontakt: aqueous dispersion of a vinyl acetate copolymer with cellulose ether, quartz sand, ground limestone, and iron oxide pigment
Knauf Quarzgrund: aqueous dispersion of copolymers of acrylic acid esters, mineral fillers, quartz sand, white pigments, water, and additives
Knauf Perlfix: calcium sulfate hemihydrate with additives
Knauf white glue: low-formaldehyde dispersion glue, based on polyvinyl acetate in water
Knauf Brio Joint Adhesive: aqueous polymer dispersion It can be inferred from the table that the use of a corresponding primer has substantial influence on the adhesive strengths between plasterboard slab or plasterboard cardboard and the film of the VIPs. If plasterboard slabs are glued on, Knauf Spezialgrund, which is based on a dispersion of acrylic copolymers with ground limestone, has proven to be best suitable. With corresponding application of force, tearing off of the plate from the film by hand is also possible here; however, the required application of force is relatively high.

If plasterboard cardboards are glued on, the primer also shows a clear influence on the adhesion here. Knauf Spezialgrund as a primer results, in combination with Knauf white glue and also with Knauf Brio Joint Adhesive, in the best results in each case. If other primers are used, the results are worse.

LIST OF REFERENCE NUMERALS 11 layered body
12 thermal insulation body
13 core material (thermal insulation body)
14 first flat side (thermal insulation body)
15 second flat side (thermal insulation body)
16 gas-tight film
17 cardboard layer
18 plasterboard slab
19 primer layer
20 adhesive layer
21 cardboard layer (facing away from thermal insulation body)
22 plaster core
23 first end (layered body)
24 second end (layered body)
25 seal
26 plasterboard strip
27 window
28 masonry

The invention claimed is:

1. A multilayered layered body comprising an evacuated thermal insulation body having a core material, which is enclosed by a gas-tight film, wherein the thermal insulation body has a first flat side and a second flat side, which is arranged opposite of the first side,
wherein
a lamination layer is laminated onto at least one flat side,
the laminated-on lamination layer is an external component of a jacketed plasterboard, so that the jacketed plasterboard is laminated onto the thermal insulation body and a layered body comprising the evacuated thermal insulation body and the jacketed plasterboard is provided, and
a primer layer is applied between the thermal insulation body and the lamination layer, the primer layer being based on a dispersion comprising an acrylic copolymer and limestone.

2. The multilayered layered body according to claim 1, wherein the layered body is formed as a panel.

3. The multilayered layered body according to claim 1, wherein the primer layer comprises additives.

4. The multilayered layered body according to claim 1, wherein the lamination layer is permanently attached to the thermal insulation body by means of an adhesive layer.

5. The multilayered layered body according to claim 1, wherein the thickness of the thermal insulation body is not less than 5 mm and not greater than 100 mm.

6. The multilayered layered body according to claim 1, wherein the jacketed plasterboard comprises two lamination layers arranged spaced apart from one another, namely the lamination layer facing toward the thermal insulation body and a lamination layer facing away from the thermal insulation body, and a plaster core arranged in between.

7. The multilayered layered body according to claim 1, wherein the thickness of the laminated-on jacketed plasterboard is not less than 5 mm and not greater than 25 mm and the density of the plaster core is not less than 450 kg/m$^3$ and not greater than 800 kg/m$^3$, and the plaster core is formed as homogeneous or multilayered transversely to the planar extension of the jacketed plasterboard.

8. The multilayered layered body according to claim 1, wherein the jacketed plasterboard and/or the thermal insulation body have a wedge-shaped basic shape, so that a wedge-shaped layered body having a thickness continuously decreasing from a first end to a second end is provided.

9. The multilayered layered body according to claim 1, wherein the lamination layer is formed by a cardboard layer and has a grammage of not less than 80 g/m$^2$ and not greater than 220 g/m$^2$.

10. A method for producing a multilayered layered body, in particular the layered body according to claim 1, comprising the following steps:
a) providing an evacuated thermal insulation body, comprising a first flat side and a second flat side, in which a core material is enclosed by a gas-tight film, and
b) laminating on a lamination layer overlapping the thermal insulation body such that a solid bond is provided between thermal insulation body and lamination layer.

11. The method according to claim 10, wherein the lamination layer forming an external component of a jacketed plasterboard is laminated on as the lamination layer, so that a jacketed plasterboard is laminated onto the thermal insulation body and a layered body comprising the evacuated thermal insulation body and the jacketed plasterboard is provided.

12. The method according to claim 11, wherein before the lamination of the lamination layer onto the thermal insulation body, an adhesive is applied to the thermal insulation body and/or to the lamination layer.

13. The method according to claim 10, wherein the lamination layer is formed by a cardboard layer or nonwoven layer or gypsum fiber layer.

14. A method of using the multilayered body according to claim 1 comprising the steps of:
applying the multilayered body to a window or door soffit; or
applying the multilayered body to an exterior wall-interior wall attachment; or
applying the multilayered body to a story-ceiling attachment,
wherein the application of the multilayered body is configured to insulate the window, door soffit, exterior wall-interior wall attachment, or the story-ceiling attachment.

15. The multilayered body according to claim 1, wherein the primer layer comprises a vinyl acetate copolymer, cellulose ether, quartz sand, and iron oxide pigment.

16. The multilayered body according to claim 5, wherein the thickness of the thermal insulation body is not greater than 40 mm.

17. The multilayered body according to claim 16, wherein the thickness of the thermal insulation body is not greater than 10 mm.

18. The multilayered body according to claim 7, wherein the thickness of the laminated-on jacketed plasterboard is not less than 10 mm and not greater than 20 mm, and the density of the plaster core is not less than 550 kg/m$^3$ and not greater than 700 kg/m$^3$.

19. The multilayered body according to claim 9, wherein the lamination layer is formed by a cardboard layer and has a grammage of not less than 80 g/m$_2$ and not greater than 120 g/m$^2$.

\* \* \* \* \*